(12) United States Patent
Erusalagandi et al.

(10) Patent No.: US 11,877,096 B2
(45) Date of Patent: Jan. 16, 2024

(54) INTEGRATE BODY CAMERAS WITH HOTEL KEY BOX

(71) Applicant: CARRIER CORPORATION, Palm Beach Gardens, FL (US)

(72) Inventors: Anitha Swapna Erusalagandi, Telangana (IN); George Sridhar Bandhanadham, Telangana (IN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 313 days.

(21) Appl. No.: 16/972,215

(22) PCT Filed: Oct. 30, 2019

(86) PCT No.: PCT/US2019/058696
§ 371 (c)(1),
(2) Date: Dec. 4, 2020

(87) PCT Pub. No.: WO2020/092460
PCT Pub. Date: May 7, 2020

(65) Prior Publication Data
US 2021/0274132 A1 Sep. 2, 2021

(30) Foreign Application Priority Data
Nov. 1, 2018 (IN) .............................. 201811041411

(51) Int. Cl.
H04N 7/18 (2006.01)
G06F 1/16 (2006.01)
G07C 9/00 (2020.01)

(52) U.S. Cl.
CPC ............. *H04N 7/185* (2013.01); *G06F 1/163* (2013.01); *G07C 9/00182* (2013.01)

(58) Field of Classification Search
None
See application file for complete search history.

(56) References Cited

U.S. PATENT DOCUMENTS

| 9,882,918 B1 | 1/2018 | Ford et al. |
| 10,053,056 B1* | 8/2018 | Zhang ..................... B60R 25/25 |
| 11,072,945 B2* | 7/2021 | Johnson ................. G08B 13/08 |
| 2017/0046891 A1* | 2/2017 | Trivelpiece ........ G07C 9/00309 |
| 2017/0150090 A1 | 5/2017 | McHenry et al. |

(Continued)

FOREIGN PATENT DOCUMENTS

KR 1020150062430 * 8/2015 ........... A61N 1/3968

OTHER PUBLICATIONS

International Search Report and Written Opinion for Application No. PCT/US2019/058696; dated Jan. 22, 2020; 16 pages.

(Continued)

*Primary Examiner* — Ricky Chin
(74) *Attorney, Agent, or Firm* — CANTOR COLBURN LLP

(57) ABSTRACT

Provided are techniques for integrating a body camera with a locking mechanism. The techniques include assigning a body camera to a user and detecting a proximity of the body camera to a locking mechanism. The techniques also include determining a state of the locking mechanism, and automatically triggering recording of the body camera based at least in part on the proximity and the state of the locking mechanism.

12 Claims, 2 Drawing Sheets

(56) References Cited

U.S. PATENT DOCUMENTS

| | | | |
|---|---|---|---|
| 2017/0214843 A1 | 7/2017 | Boykin | |
| 2017/0228731 A1 | 8/2017 | Sheng et al. | |
| 2017/0316390 A1 | 11/2017 | Smith et al. | |
| 2017/0323381 A1 | 11/2017 | Todd | |
| 2018/0005469 A1* | 1/2018 | Campbell | G07C 9/27 |
| 2018/0117446 A1 | 5/2018 | Tran | |
| 2018/0167394 A1 | 6/2018 | High et al. | |
| 2018/0191714 A1 | 7/2018 | Jentzsch et al. | |
| 2018/0277154 A1* | 9/2018 | Mack | G11B 20/02 |
| 2020/0005614 A1* | 1/2020 | Lark | G08B 13/19621 |
| 2020/0027295 A1* | 1/2020 | Bigert | H04W 12/084 |

OTHER PUBLICATIONS

Anonymous, "Safe4 enhances its Smart Home Offering with Smart Door Locks from Yale", URL: https://www.chipin.com, 7 pages.

BlockchainHub, "Smart Contracts", URL: https://blockchainhub.net, Jul. 2019, 6 pages.

Evans et al., "Seven Possible Killer Apps for Blockchain and Digital Tokens", URL: www.bcg.com, Dec. 1, 2016, 7 pages.

OkeyDokey, "Revolutioning the Property Rental System?", OkeyDokeyProject, Apr. 19, 2018, 4 pages.

Ostrowski, "Time-locked Wallets: An Introduction to Ethereum Smart Contracts", Medium, Mar. 5, 2018, 20 pages.

TrustNodes, "Toyota Prototypes Ethereum Bloackchain Based Car Sharing Uber Alternative", URL: https://www.trustnodes.com, May 28, 2017, 14 pages.

Williams, "This Automaker Just Became the First to Test Blockchain in Its Cars", The Motley Fool, Mar. 4, 2018, 6 pages.

Complexity Labs, "IoT Blockchain Convergence", https://complexitylabs.io/iotblockchain/, accessed Aug. 27, 2018, 3 pages.

PopulStay, "Blockchain based Smart Lock", https://www.populstay.com/, accessed Aug. 27, 2018, 11 pages.

International Preliminary Report on Patentability dated May 14, 2021 for Application No. PCT/US19/058696.

\* cited by examiner

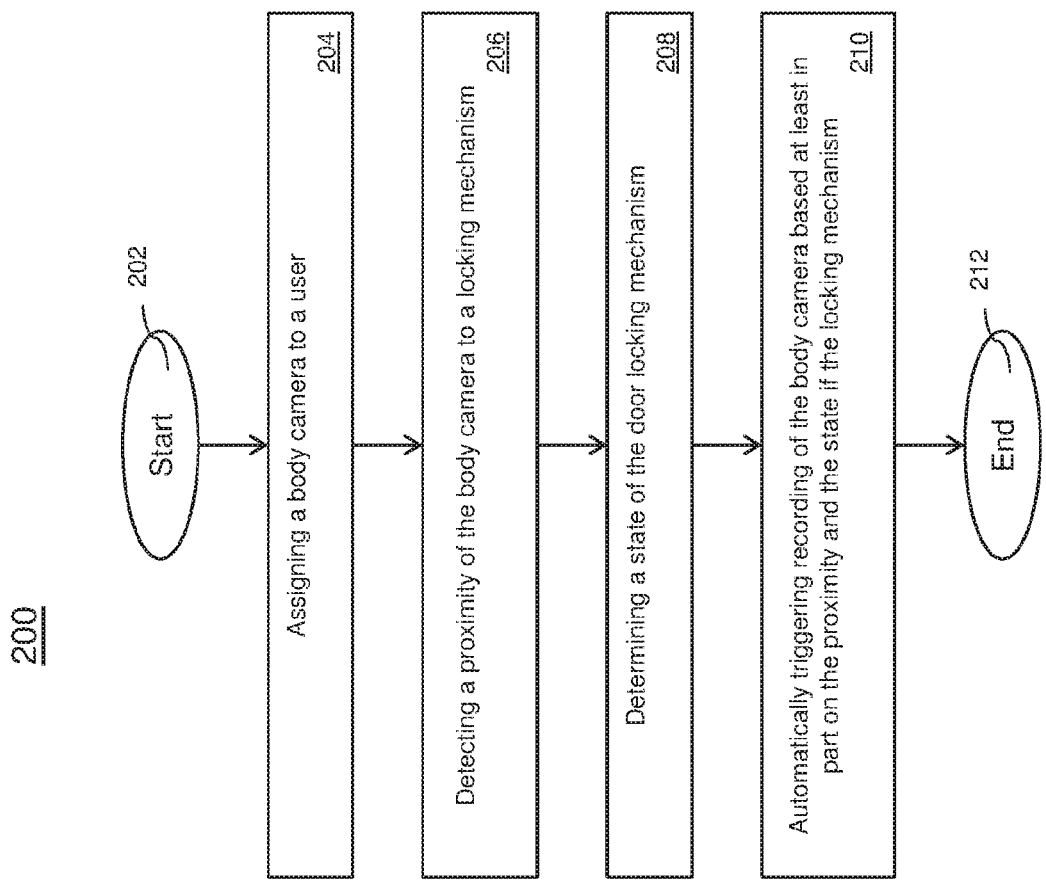

INTEGRATE BODY CAMERAS WITH HOTEL KEY BOX

BACKGROUND

Exemplary embodiments pertain to the art of electronic keys and lockboxes, and more particularly to the integration of body cameras with a key box.

In today's environment, various types of keys are used to obtain access to restricted areas. The various types of keys can include traditional keys, key cards, fobs, codes, biometrics, etc. For example, hotels oftentimes provide key cards to its guests that allow them to access an assigned room for a period of time. In the event the guest loses their key cards, the hotel can provide the guest with another key card. In the event the guest does not return the key cards after their scheduled stay, the key cards can be deactivated to restrict the key cards access and a new key can be assigned.

The use of restricted areas is often associated with additional services that are performed by staff personnel who may have temporary access to enter the restricted areas and provide some type of service. For example, in a hotel a housekeeper will clean and service a guest's room. For the safety of the housekeeper and the confidence of the guest, assurance is needed that the housekeeper only cleaned the room and did not compromise any of the guest's personal belongings.

BRIEF DESCRIPTION

According to an embodiment, system for integrating body cameras with a locking mechanism is provided. The system includes a body camera having a camera configured to obtain camera data, a memory configured to store a body camera identifier and configured to store the camera data, a location determination module configured to determine a location of the body camera, and a communication module configured to transmit data to a locking mechanism and determine a proximity to the locking mechanism. The locking mechanism also includes a sensor configured to detect a state of the locking mechanism, and a locking device configured to lock and unlock the locking mechanism responsive to the data from the body camera.

In addition to one or more of the features described herein, or as an alternative, further embodiments include using a state of the locking mechanism having a locked and unlocked state.

In addition to one or more of the features described herein, or as an alternative, further embodiments include a sensor that is configured to detect an opening or closing of a door coupled to the locking mechanism.

In addition to one or more of the features described herein, or as an alternative, further embodiments include a location determination module that is a GPS module configured to obtain location information of the body camera.

In addition to one or more of the features described herein, or as an alternative, further embodiments include a body camera that is configured to automatically record the camera data based at least in part on sensing the opening of the door coupled to the locking mechanism.

In addition to one or more of the features described herein, or as an alternative, further embodiments include a body camera that is configured to deactivate the body camera responsive to at least one of the proximity of the body camera to the locking mechanism or closing of the door.

In addition to one or more of the features described herein, or as an alternative, further embodiments include using a proximity of the body camera to the locking mechanism that is based at least in part on a Bluetooth signal strength.

In addition to one or more of the features described herein, or as an alternative, further embodiments include detecting the proximity over a first communication channel, and transmitting the camera data over a second communication channel, wherein the first communication channel is different than the second communication channel.

In addition to one or more of the features described herein, or as an alternative, further embodiments include data that authorizes the body camera to lock or unlock the locking mechanism based at least in part on an association of one or more of a body camera identifier, a locking mechanism identifier, and a period of time.

In addition to one or more of the features described herein, or as an alternative, further embodiments include at least one of the body camera or the locking mechanism that is configured to transmit real-time camera data to an external system.

According to another embodiment, a method for integrating a body camera with a locking mechanism is provided. The method includes assigning a body camera to a user, detecting a proximity of the body camera to a locking mechanism, determining a state of the locking mechanism, and automatically triggering recording of the body camera based at least in part on the proximity to the locking mechanism and the state of the locking mechanism.

In addition to one or more of the features described herein, or as an alternative, further embodiments include using a state of the locking mechanism having a locked state and an unlocked state.

In addition to one or more of the features described herein, or as an alternative, further embodiments include sensing, by one or more sensors, an opening or closing of a door coupled to the locking mechanism.

In addition to one or more of the features described herein, or as an alternative, further embodiments include confirming a location of the body camera based on detecting GPS data of the body camera, wherein the confirmation is performed prior to automatically triggering the recording of the body camera.

In addition to one or more of the features described herein, or as an alternative, further embodiments include automatically triggering the recording of the body camera is based at least in part on sensing the opening of the door coupled to the locking mechanism.

In addition to one or more of the features described herein, or as an alternative, further embodiments include deactivating the body camera responsive to at least one of the proximity of the body camera to the locking mechanism or closing of the door.

In addition to one or more of the features described herein, or as an alternative, further embodiments include the proximity of the body camera to the locking mechanism is based at least in part on a Bluetooth signal strength.

In addition to one or more of the features described herein, or as an alternative, further embodiments include detecting the proximity over a first communication channel, and transmitting the camera data over a second communication channel, wherein the first communication channel is different than the second communication channel.

In addition to one or more of the features described herein, or as an alternative, further embodiments include authorizing the body camera to lock or unlock the locking mechanism based at least in part on an association of one or more of a body camera identifier, a locking mechanism identifier, and a period of time.

In addition to one or more of the features described herein, or as an alternative, further embodiments include transmitting real-time camera data to an external system from at least one of the body camera or the locking mechanism.

Technical effects of embodiments of the present disclosure include integrating body cameras with electronic key boxes to trigger the activation of the body camera to begin recording.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike:

FIG. 2 depicts a flowchart of a method for operating an integrated body camera with a locking mechanism in accordance with one or more embodiments.

DETAILED DESCRIPTION

Figure 1:
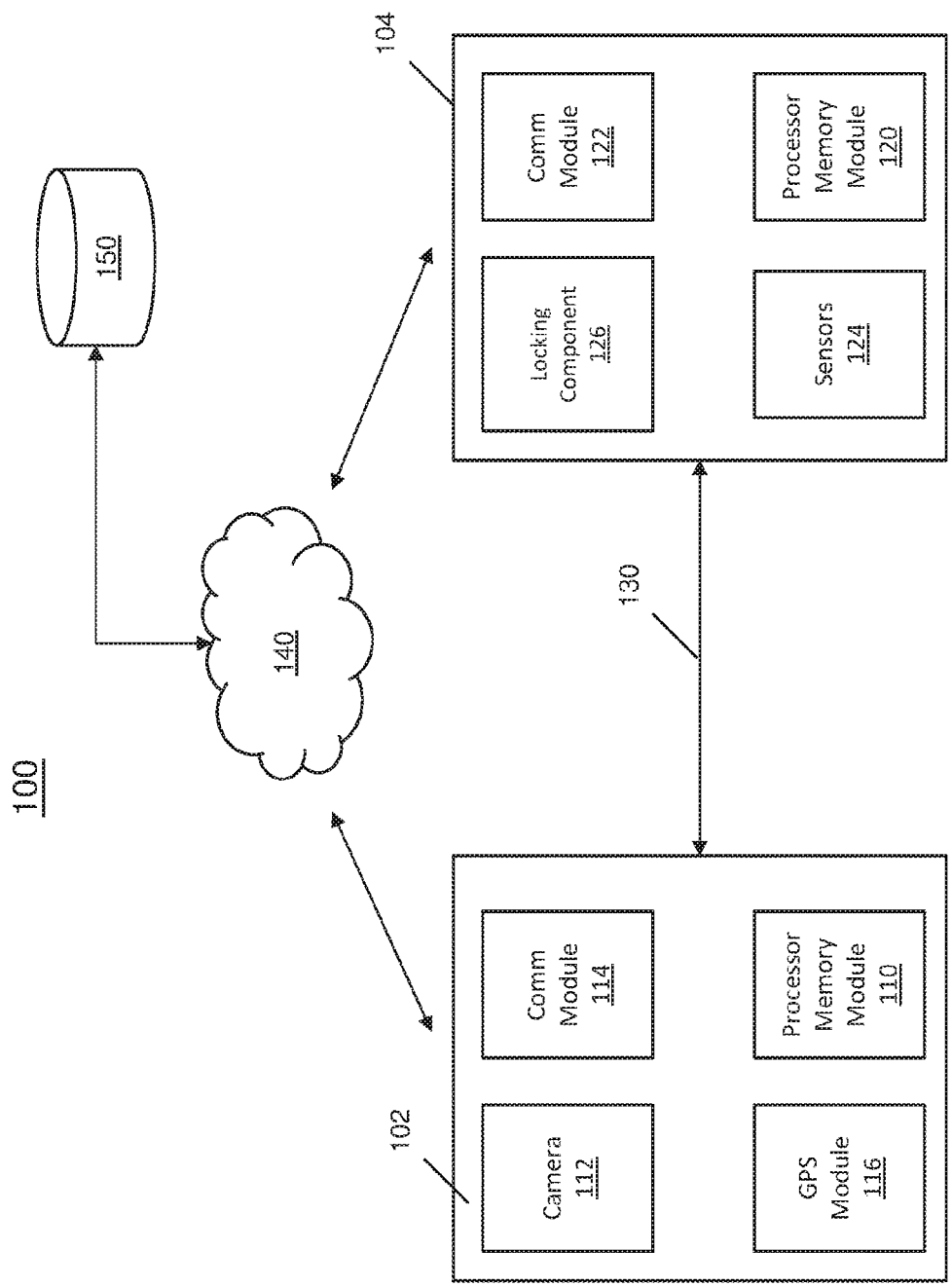
FIG. 1 depicts a system integrating body cameras with a locking mechanism in accordance with one or more embodiments.

In some scenarios, temporary access can be provided to a designated group of people for a specific purpose. For example, a service technician may need to gain access to a person's home to perform maintenance on an appliance that is located in the home. In another example, the housekeeping personal of a hotel may need to gain access to a guest's room to perform their daily tasks. In these scenarios and others, temporary access may need to be provided to select individual when the homeowner or guests are not present.

During the absence of the homeowners or guests, situations may arise that expose their personal belongings to theft or risk to those providing services on the premises. One or more techniques introduce a body camera to temporary personnel, where the body camera can include components to unlock doors by means of the Bluetooth cameras.

Responsive to unlocking the door, the body camera can be programmed to start automatically recording or streaming data. The techniques described herein activate the body camera based on the locking/unlocking of the door and based on the proximity of the body camera to the lock or opening/closing the door. The activation of the body camera can be triggered without manual user intervention. There may be a need to provide a technique to monitor the access provided to personnel on a temporary basis.

Now turning to FIG. 1, a system 100 that integrates a body camera with a key box in accordance with one or more embodiments is shown. The system 100 includes a body camera 102 that has a plurality of components and modules. In one or more embodiments, the body camera 102 can include a processor and memory 110, where the memory can be configured with instructions to cause the processor to execute a plurality of functions. The body camera 102 can be associated with a unique identifier, where the identifier can be mapped to an employee name/number the camera is assigned to.

The body camera 102 can be worn by the authorized personnel and/or attached to structures that are used in the service location such as a service cart for a housekeeping personnel or a utility cart for a maintenance technician.

The components and modules can include a camera device 112 for recording data. The body camera 102 also includes a communication module 114 (Comm Module) such as a Bluetooth module, Wi-Fi module, etc. The body camera 102 includes a GPS module 116 to determine a location of the body camera 102. It should be understood the body camera 102 can include other components and modules which can be implemented in software and/or hardware or a combination thereof.

In one or more embodiments, the recorded data is stored locally in a memory of the body camera 102 and can be downloaded from the body camera memory 110. In one or more embodiments, the body camera 102 is a battery-powered device that can be recharged. The body camera 102 can be configured to optimize battery consumption such as selecting a communication protocol to conserve battery power or transmitting various quality data.

The system 100 can also include a locking mechanism 104 that has a plurality of components and modules. The locking mechanism 104 can include a processor and memory module 120. In one or more embodiments, the locking mechanism 104 includes a unique identifier that can be mapped to a particular location such as a room of a hotel.

The locking component 126 of the locking mechanism 104 can include a magnetic lock, deadbolt lock, and/or other locking mechanism. The lock can be locked/unlocked using various techniques. In one or more embodiments, the locking mechanism 104 a communication module 122 that is configured to communicate directly over various communication channels 130 such as Bluetooth, Wi-Fi, etc. or can communicate over a network 140.

The locking mechanism 104 can include a sensor(s) 124 to detect the locked and unlocked state of the door. In addition, the sensor(s) 124 can be used to detect an opened and closed position of the door. In one or more embodiments, the locking mechanism 104 is a battery-powered device that can be recharged. It should be understood the body camera 102 can include other components and modules which can be implemented in software and/or hardware or a combination thereof.

During operation, a body camera 102 can be assigned to a user where the user can be the housekeeping staff of a hotel. The identifier of the body camera 102 can be associated with the staff identifier. Next, as the staff wearing the body camera 102 approaches a room door including a locking mechanism 104, a Bluetooth signal from the locking mechanism 104 can be transmitted and detected by the body camera 102. If the signal strength of the signal is at a threshold value the locking mechanism 104 can be unlocked. In one or more embodiments, the body camera 102 can start recording or live streaming data based on the detected signal strength. In a different embodiment, the body camera 102 can start recording or live streaming data responsive detecting an unlocked state of the locking mechanism 104 and opening the door corresponding to the locking mechanism 104.

The activation of the body camera 102 can be based on the proximity of the body camera 102 to the locking mechanism 104. In a different configuration, the activation of the body camera 102 can be based on locking/unlocking the door and/or opening/closing a door. The recording of the body camera 102 is automatically where the user intervention is not required.

It should be understood that an indication can be provided to the user of the recording status by the body camera 102. The indications can include a red/green light, audio indication such as a chime, etc.

In one or more embodiments, the camera data can be transmitted to an external system/storage 150 from the body camera 102 and/or the locking mechanism 104. In addition, the camera data can be relayed/forwarded from other devices such as an access point, smart card etc. over a network for analysis and/or storage.

In a similar fashion, upon detection that the door is closed the locking mechanism 104 switches to the locked state and the body camera 102 stops recording is stopped. In another embodiment, the signal strength of the Bluetooth signal can be checked to ensure the body camera 102 has left the room before turning the camera off. In a different embodiment, upon detection of the locked state, signal strength, and a configurable delay the body camera 102 can be deactivated.

In one or more embodiments, the body camera 102 may be programmed to lock/unlock a specific subset of doors or can be programmed to have access to the doors during a predetermined window of time.

In one or more embodiments, the recording can be live-streamed and transmitted to a mobile device or to a central location such as a server or front-desk personnel. The front-desk can send commands through the network to the locking mechanism 104 to allow access to a body camera 102.

FIG. 2 depicts a method 200 for operating the integration of the body cameras with a key lock. The method 200 begins at block 202 and proceeds to block 204 which provides for assigning a body camera 102 to a user. A unique identifier of the body camera 102 and an identifier for the user can be stored in a server or database to assign the body camera to the user.

Block 206 provides for detecting a proximity of the body camera 102 to a locking mechanism 104. The distance between the body camera and the locking mechanism can be detected to perform the locking/unlocking of the locking mechanism. In other embodiments, responsive to detecting the Bluetooth beacon, the body camera 102 can transmit through the communication module 114 a body camera identifier and/or a key to the locking mechanism 104 to trigger the locking mechanism 104 to switch states. The processor of the locking mechanism 104 can determine whether the body camera 102 is authorized to unlock the door by comparing the body camera identifier with the permissions allowed for the body camera 102.

The proximity of the Bluetooth signal between the body camera 102 and the locking mechanism 104 can be used to lock/unlock the locking mechanism 104. A threshold value for the signal strength can be configured by an administrator or a default value can be used which can be correlated to a distance. In addition, the movement of the body camera can be detected by a GPS, accelerometer or gyroscope. This can be used to eliminate the inadvertent access to doors.

Block 208 provides for determining a state of the door locking mechanism 104. The states can include a locked state and an unlocked state. The locking mechanism 104 can be determined using a sensor that is configured to detect a position of the lock corresponding to the locking mechanism 104.

The method 200 at block 210 provides for automatically triggering recording of the body camera 102 based at least in part on the proximity to the locking mechanism 104 and the state of the locking mechanism 104. In one or more embodiments, the recording performed by the body camera 102 may be triggered by opening the door to the locked room. In one or more embodiments, GPS data can be used to confirm whether the user has entered the access controlled room and triggering the recording by the body camera 102 upon the user entering the room.

The body camera 102 can be deactivated as the user exits the room. This can be detected by the closing of the door, the locking of the locking mechanism, a signal strength of the Bluetooth signal, location information provided by the GPS, an expiration of a time period or any combination thereof. The method 200 ends at block 212. The method 200 can be repeated as the body camera 102 is within range of the locking mechanism 104.

The technical benefits and effects provide for monitoring the temporary personnel while performing duties in the restricted areas. In addition, the technical benefits and effects include discouraging the personnel from obtaining items that may not belong to them. The body cameras provide protection to a person's property as well as the personnel wearing the body camera. The body cameras can also monitor how a user's time is spent and enhance the quality of work.

A detailed description of one or more embodiments of the disclosed apparatus and method are presented herein by way of exemplification and not limitation with reference to the Figures.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system integrating body cameras with a locking mechanism, the system comprising:
   a body camera comprising:
   a camera configured to obtain camera data;
   a memory configured to store a body camera identifier and configured to store the camera data;
   a location determination module configured to determine a location of the body camera; and
   a communication module configured to transmit data to a locking mechanism and determine a proximity to the locking mechanism,
   wherein the locking mechanism comprises:
   a sensor configured to detect a state of the locking mechanism; and
   a locking device configured to lock and unlock the locking mechanism responsive to the data from the body camera;
   wherein the state of the locking mechanism includes a locked and unlocked state;
   wherein the sensor is configured to detect an opening or closing of a door coupled to the locking mechanism;
   wherein the body camera is configured to automatically record the camera data based at least in part on sensing the opening of the door coupled to the locking mechanism;
   wherein the body camera is configured to deactivate the body camera responsive to at least one of the proximity of the body camera to the locking mechanism or closing of the door.

2. The system of claim 1, wherein the location determination module is a GPS module configured to obtain location information of the body camera.

3. The system of claim 1, wherein the proximity of the body camera to the locking mechanism is based at least in part on a Bluetooth signal strength.

4. The system of claim 3, wherein the proximity is detected over a first communication channel; and the camera data is transmitted over a second communication channel, wherein the first communication channel is different than the second communication channel.

5. The system of claim 1, wherein the data authorizes the body camera to lock or unlock the locking mechanism based at least in part on an association of one or more of a body camera identifier, a locking mechanism identifier, and a period of time.

6. The system of claim 1, wherein at least one of the body camera or the locking mechanism is configured to transmit real-time camera data to an external system.

7. A method for integrating a body camera with a locking mechanism, comprising:
   assigning a body camera to a user;
   detecting a proximity of the body camera to a locking mechanism;
   determining a state of the locking mechanism; and
   automatically triggering recording of the body camera based at least in part on the proximity to the locking mechanism and the state of the locking mechanism;
   wherein the state of the locking mechanism includes a locked state and an unlocked state;
   sensing, by one or more sensors, an opening or closing of a door coupled to the locking mechanism;
   wherein automatically triggering the recording of the body camera is based at least in part on sensing the opening of the door coupled to the locking mechanism;
   deactivating the body camera responsive to at least one of the proximity of the body camera to the locking mechanism or closing of the door.

8. The method of claim 7, further comprising confirming a location of the body camera based on detecting GPS data of the body camera, wherein the confirmation is performed prior to automatically triggering the recording of the body camera.

9. The method of claim 7, wherein a proximity of the body camera to the locking mechanism is based at least in part on a Bluetooth signal strength.

10. The method of claim 9, wherein detecting the proximity occurs over a first communication channel; and
    transmitting camera data over a second communication channel, wherein the first communication channel is different than the second communication channel.

11. The method of claim 7, further comprising authorizing the body camera to lock or unlock the locking mechanism based at least in part on an association of one or more of a body camera identifier, a locking mechanism identifier, and a period of time.

12. The method of claim 7, further comprising transmitting real-time camera data to an external system from at least one of the body camera or the locking mechanism.

* * * * *